April 2, 1929.  F. RIEDEL  1,707,540
AUTOMOBILE HEADLIGHT
Filed April 5, 1928
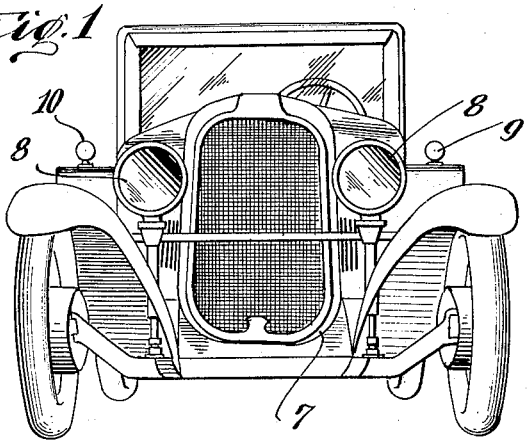
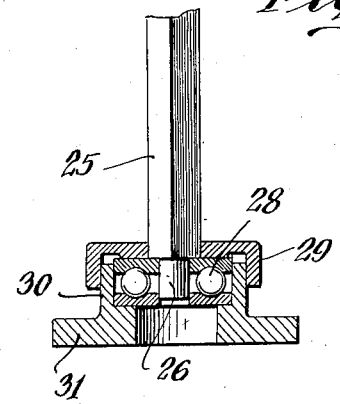
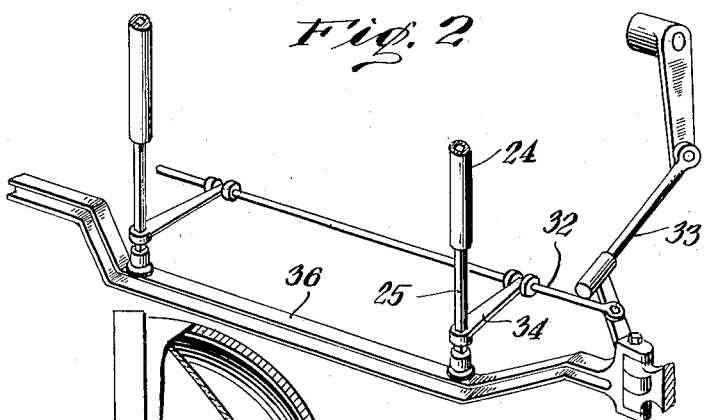
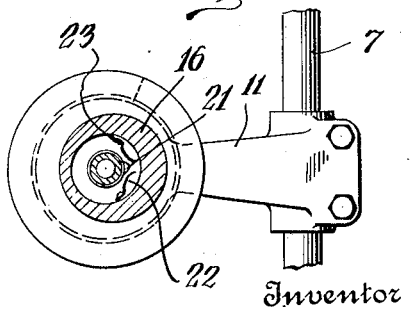
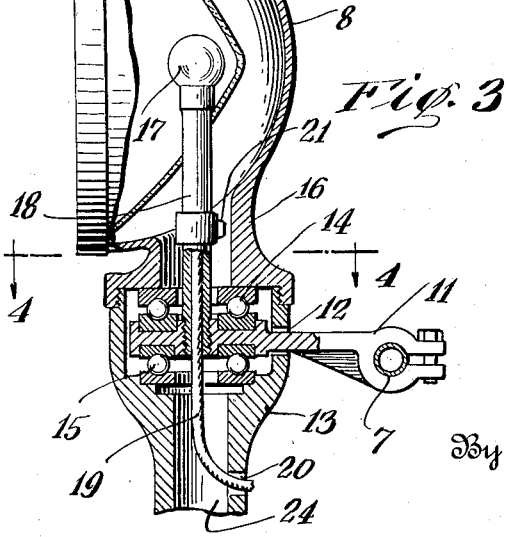
Inventor
Franz Riedel
By his Attorney Patented Apr. 2, 1929.

1,707,540

UNITED STATES PATENT OFFICE.

FRANZ RIEDEL, OF LONG ISLAND CITY, NEW YORK.

AUTOMOBILE HEADLIGHT.

Application filed April 5, 1928. Serial No. 267,561.

This invention relates to automobile headlights and more particularly to devices for automatically controlling the position of such headlights.

The usual headlight commonly included in the equipment of automobiles is not dirigible and is rigidly supported so that it is at all times parallel with the body of the automobile. This manner of mounting headlights is objectionable in that when the automobile is being turned, the wheels will be pointed in one direction and the headlight will be directed in another direction, with the result that the area into which the automobile is being turned is not illuminated.

It is therefore an object of this invention to provide a device for automatically positioning a headlight so that it will at all times be directed to correspond with the turning of the wheels.

A further object is to provide a headlight which may be attached to a standard automobile without material alterations.

A still further object is to provide a dirigible headlight which follows the turning of the wheels and at the same time is equipped with means for indicating to others the direction in which the wheels are being turned.

These and other objects are attained by the novel construction, combination and arrangement of parts, hereinafter described and shown in the accompanying drawing, constituting a material part of this disclosure, and in which:—

Figure 1 is a front view of an automobile equipped with the dirigible headlight and signalling means on the rear mud guards.

Figure 2 is a perspective view showing the manner in which the operating structure is connected to a steering mechanism.

Figure 3 is a cross-sectional view showing details of the mounting structure.

Figure 4 is a cross-sectional view taken along the line 4—4 of Figure 3.

Figure 5 is a fragmentary sectional view of one of the rod supports.

Referring to the drawings, in Figure 1 is shown the front view of an automobile having the usual headlight supporting bar 7 with headlights 8 mounted thereon and signal lights 9 and 10 mounted on the rear mud guards for the purpose of indicating the direction in which the automobile is being turned.

In Figure 3, each headlight is shown to be mounted on the rod 7 by means of an arm 11 clamped about rod 7, the arm 11 passing through a horizontal slot 12 in the casing 13 and having suitable ball bearings 14 and 15 mounted on its extremity to facilitate the turning of casings 13 and 16 relative to the arm 11.

The upper casing 16, which forms the base of the headlight structure, is threadedly connected with the lower casing 13 and adapted to turn therewith.

Positioned in the headlight 8 is the usual incandescent lamp 17 suitably mounted on the stationary tube 18, through which passes the wires 19 which also pass through an aperture 20 in the casing 13 and thence to a source of electrical current.

Mounted on the supporting tube 18 is an electrical contact button 21 which is adapted to engage either of the spring contact members 22 and 23 to close an electrical circuit to cause either of the lamps 9 or 10 to light, depending upon the direction in which the automobile is being turned.

The casing 13 has a tubular portion 24 which is rectangular in cross-section at its lower end to accommodate the rectangular rod 25, shown in Figure 3. The lower end of rod 25, indicated by the numeral 26, is circular in cross-section and is journalled in the plates of a ball bearing 28, which is housed in the chamber formed by the flange 30 of the supporting bracket 31, the latter being mounted on the front axle 36 of an automobile. A cover plate 29 is provided with a downturned flange to completely encase the ball bearing 28 and the plate 29 is adapted to turn with the rod 25.

Non-rotatably connected with the rod 25 is an arm 34, the end of which rests loosely between the discs on rod 32 connected with the steering mechanism and consequently rod 25 will be likewise rotated to turn the casing 13 and headlight 8 in a direction corresponding to the direction in which the wheels are being turned. During this turning movement, contact button 21 will close a circuit through either spring 22 or 23 to cause one of the rear indicator lamps to be lighted.

The foregoing description is to be regarded as descriptive and illustrative only and not as restrictive or limitative of the invention, of which obviously an embodiment may be constructed, including many modifications, without departing from the general scope herein indicated and denoted in the appended claims.

Having thus described my invention, what I claim as new and desire to secure by Letters Patent, is:—

1. A dirigible headlight comprising a hollow casing having a horizontal slot, an arm mounted on a suitable support and extending into the casing through the slot, a tube in threaded engagement with the arm and supporting an incandescent lamp properly positioned in the headlight, friction reducing means interposed between said arm and the casing, a rod non-rotatably engaging and extending into the casing, and means for connecting said rod with the steering mechanism of an automobile so that the casing will be turned in a direction corresponding with the direction in which the wheels of the automobile are being turned.

2. A dirigible headlight for automobiles comprising a hollow casing having a horizontal slot, an arm mounted on a suitable support and extending into the casing through the slot, means connected with said arm for supporting an incandescent lamp, and means connecting said casing with the steering mechanism of an automobile so that the casing will be turned in a direction corresponding to the direction in which the wheels of the automobile are being turned.

In witness whereof I have affixed my signature.

FRANZ RIEDEL.